US008342943B1

(12) United States Patent
Gibase et al.

(10) Patent No.: US 8,342,943 B1
(45) Date of Patent: Jan. 1, 2013

(54) SYSTEMS AND METHODS FOR PROVIDING PERSONALIZED REWARDS FOR PLAYERS OF SLOT MACHINES

(75) Inventors: Chris Gibase, Henderson, NV (US); Dennis Frey, Las Vegas, NV (US)

(73) Assignee: Boyd Gaming Corporation, Las Vegas, NV (US)

( * ) Notice: Subject to any disclaimer, the term of this patent is extended or adjusted under 35 U.S.C. 154(b) by 1114 days.

(21) Appl. No.: 11/737,657

(22) Filed: Apr. 19, 2007

Related U.S. Application Data

(60) Provisional application No. 60/796,063, filed on Apr. 28, 2006.

(51) Int. Cl.
*A63F 13/00* (2006.01)

(52) U.S. Cl. ............ 463/25; 463/16; 463/20; 705/14.12

(58) Field of Classification Search .................... 463/16, 463/25, 20; 705/14.12
See application file for complete search history.

(56) References Cited

U.S. PATENT DOCUMENTS

| | | | | |
|---|---|---|---|---|
| 6,110,041 | A | 8/2000 | Walker et al. | |
| 6,238,288 | B1 | 5/2001 | Walker et al. | |
| 6,254,483 | B1 | 7/2001 | Acres | |
| 6,293,866 | B1 | 9/2001 | Walker et al. | |
| 6,695,700 | B2 | 2/2004 | Walker et al. | |
| 6,764,397 | B1 | 7/2004 | Robb | |
| 6,884,173 | B2 | 4/2005 | Gauselmann | |
| 7,033,276 | B2 | 4/2006 | Walker et al. | |
| 2002/0013173 | A1 | 1/2002 | Walker et al. | |
| 2002/0045473 | A1 | 4/2002 | Walker et al. | |
| 2002/0142846 | A1 * | 10/2002 | Paulsen | 463/43 |
| 2003/0078101 | A1 | 4/2003 | Schneider et al. | |
| 2004/0142742 | A1 | 7/2004 | Schneider et al. | |
| 2004/0185929 | A1 | 9/2004 | Walker et al. | |
| 2004/0242324 | A9 | 12/2004 | Walker et al. | |
| 2004/0254010 | A1 * | 12/2004 | Fine | 463/25 |
| 2005/0029745 | A1 | 2/2005 | Walker et al. | |
| 2005/0119052 | A1 | 6/2005 | Russell et al. | |
| 2005/0239545 | A1 | 10/2005 | Rowe | |
| 2006/0084496 | A1 | 4/2006 | Jaffe et al. | |

OTHER PUBLICATIONS

Howard Stutz, "Innovation is Served," Las Vegas Review-Journal, Oct. 3, 2005, Section D, p. 3D.

* cited by examiner

*Primary Examiner* — Peter DungBa Vo
*Assistant Examiner* — Damon Pierce
(74) *Attorney, Agent, or Firm* — Austin Rapp & Hardman

(57) ABSTRACT

A method for providing personalized rewards to slot machine players may involve defining multiple player categories. The method may also involve providing player category rules. The method may also involve assigning slot machine players to the player categories based on the player category rules. During a gaming session on a slot machine, the method may involve identifying a current player on the slot machine and identifying a player category to which the current player is assigned. In response to detecting a triggering event involving the current player's activity on the slot machine, bonus credits may be awarded to the current player based on the player category that is assigned to the current player.

13 Claims, 8 Drawing Sheets

442

| WINNING COMBINATION | 1 COIN | | | 2 COINS | | | 3 COINS | | |
|---|---|---|---|---|---|---|---|---|---|
| | A | B | C | A | B | C | A | B | C |
| 7-7-7 | 4 | 2 | 1 | 8 | 4 | 2 | 12 | 8 | 4 |

FIG. 4

542

| AMOUNT WAGERED | BONUS CREDITS | | |
|---|---|---|---|
| | A | B | C |
| $200 | 10 | 5 | 1 |

FIG. 5

642

| TIME SPENT | BONUS CREDITS | | |
|---|---|---|---|
| | A | B | C |
| 1.5 hours | 10 | 6 | 1 |
| 1 hour | 5 | 3 | 0 |

FIG. 6

| AMOUNT WAGERED 848 | PLAYER CATEGORY 836 |
|---|---|
| x > Threshold1 | A |
| Threshold1 ≥ x > Threshold2 | B |
| x ≤ Threshold2 | C |

SYSTEMS AND METHODS FOR PROVIDING PERSONALIZED REWARDS FOR PLAYERS OF SLOT MACHINES

RELATED APPLICATIONS

This application is related to and claims priority from U.S. Provisional Patent Application Ser. No. 60/796,063 filed Apr. 28, 2006, for "Systems and Methods for Providing Personalized Rewards for Players of Slot Machines," with inventors Chris Gibase and Dennis J. Frey, which is incorporated herein by reference.

TECHNICAL FIELD

The present disclosure relates generally to gaming and gaming-related technology. More specifically, the present disclosure relates to systems and methods for providing personalized rewards for players of slot machines.

BACKGROUND

Gaming (sometimes referred to as gambling) generally involves placing a wager on various possible random outcomes or combinations of outcomes in hopes of winning a reward (typically money). A popular recreational activity, gaming is enjoyed by many people around the world.

A casino is a facility that accommodates gaming activities. Casinos are typically combined with hotels, and may offer other forms of entertainment in addition to gaming. For example, casinos may include restaurants, live entertainment events (e.g., boxing, concerts, etc.), retail shopping, and so forth.

Slot machines are one of the most popular attractions in casinos. One type of slot machine is a mechanical device that includes a number of spinning reels and a payline. Another type of slot machine is a computing device that includes a display screen. On this type of slot machine, the "reels" and the "payline" may be images that are displayed on the display screen. Typically, the goal when playing a slot machine is to spin the reels (either the mechanical reels or the images of reels on the video display) so that the symbols on all of the reels line up on the payline (either a physical payline or an image of a payline on a video display) in a winning combination. When a player achieves a winning combination in this manner, the player may win a payout. The amount of the payout may be determined by a payout table, which may be posted on the front of the slot machine or contained on the display screen.

A significant percentage of a casino's revenue is generated by slot machine players. As a result, casinos compete quite aggressively for slot machine players. Casinos are constantly searching for new, unique, and interesting ways to attract slot machine players. Some casinos offer programs that provide rewards for players of slot machines.

With typical reward programs, promotional points are awarded to a player based on the player's activity at the slot machines within a particular casino or within affiliated casinos. Promotional points may be awarded based upon amounts wagered, games played, or numerous other money transactions between a player and a casino. The promotional points may be redeemable for gifts, meals, cash and the like.

Some slot machine players spend quite a bit of money while playing slot machines, while others may not spend as much money while playing. In addition, some slot machine players may play quite frequently, while other slot machine players may play on an infrequent basis. In some cases a relatively small percentage of slot machine players may generate most of the slot machine-related revenue for a casino. The present disclosure relates to improved systems and methods for providing rewards for players of slot machines.

BRIEF DESCRIPTION OF THE DRAWINGS

FIG. 4 illustrates an example of a bonus rule that may be defined;

FIG. 5 illustrates another example of a bonus rule that may be defined;

FIG. 6 illustrates another example of a bonus rule that may be defined;

DETAILED DESCRIPTION

Figure 1:
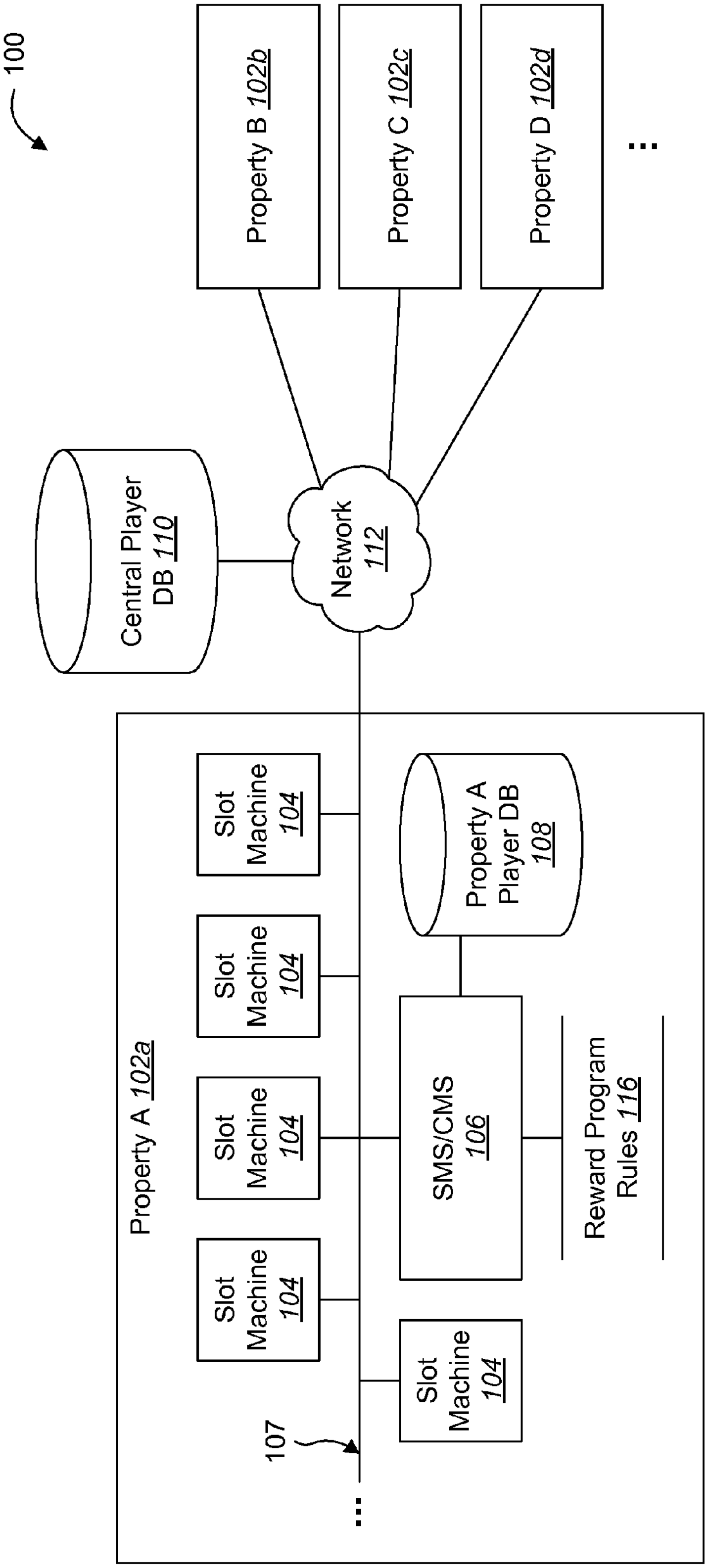
FIG. 1 illustrates an exemplary system in which embodiments may be practiced.

A method for providing personalized rewards to slot machine players is disclosed. In accordance with the method, multiple player categories may be defined. The player categories may correspond to different levels of play on slot machines at one or more participating properties. Player category rules may be provided. Slot machine players may be assigned to the player categories based on the player category rules. During a gaming session on a slot machine, a current player on the slot machine may be identified. A player category to which the current player is assigned may also be identified. In response to detecting a triggering event involving the current player's activity on the slot machine, bonus credits may be awarded to the current player based on the player category that is assigned to the current player. The bonus credits may be awarded in addition to any credits won by the current player during normal play of the slot machine.

The triggering event may be the current player achieving a winning combination on the slot machine. Alternatively, the triggering event may be the current player wagering an amount of money within a defined period of time. Alternatively still, the triggering event may be the current player spending an amount of consecutive time playing on the slot machine.

A notification message may be displayed on the slot machine in response to the bonus credits being awarded to the current player. The notification message may be displayed via an interface that is selected from the group consisting of a slot monitoring system interface, an iCMS interface, an Iview interface, a standard text digital display, and an NT interface.

The bonus credits may include a mixture of non-cashable credits, cashable credits, and hand-paid funds. For example, the bonus credits may include non-cashable credits up to a first threshold, cashable credits between the first threshold and a second threshold, and hand-paid funds beyond the second threshold.

The method may also involve providing access to reward program information via one or more kiosks. Alternatively, or in addition, access to reward program information may be provided via an e-commerce interface.

A computer system that is configured to provide personalized rewards to slot machine players is also disclosed. The computer system includes a processor and memory in electronic communication with the processor. Instructions are stored in the memory. The instructions are executable to define multiple player categories, provide player category rules, and assign slot machine players to the player categories based on the player category rules. During a gaming session on a slot machine, the instructions may be executable to identify a current player on the slot machine. The instructions may also be executable to identify a player category to which the current player is assigned. The instructions may also be executable to detect a triggering event involving the current player's activity on the slot machine. In response to detecting the triggering event, the instructions may also be executable to award bonus credits to the current player based on the player category that is assigned to the current player. The bonus credits may be awarded in addition to any credits won by the current player during normal play of the slot machine.

A method for providing a personalized rewards program for slot machine players is disclosed. The method may involve monitoring activity of slot machine players on slot machines at one or more participating properties. When a slot machine player plays on a slot machine, the method may involve adjusting a hold percentage of the slot machine for the slot machine player based on playing history information about the slot machine player. The hold percentage may be adjusted without making adjustments to the slot machine.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

FIG. 1 illustrates an exemplary system 100 in which embodiments may be practiced. The system 100 may be implemented across a number of different properties 102, such as property A 102*a*, property B 102*b*, property C 102*c*, and property D 102*d*. As used herein, the term "property" may refer to any facility that includes slot machines and that allows at least some patrons to play on the slot machines. For example, the term "property" may refer to a casino. Alternatively, the term "property" may refer to other types of facilities, such as restaurants, grocery stores, airports, etc. Each of the properties 102 shown in FIG. 1 may be owned, managed, or under the control of the same gaming organization.

Within property A 102*a*, a number of different slot machines 104 may be provided. As discussed above, the goal when playing a slot machine 104 is typically to spin multiple reels (either mechanical reels or images of reels on a video display) so that the symbols on all of the reels line up on the payline (either a physical payline or an image of a payline on a video display) in a winning combination. When a player achieves a winning combination in this manner, the player may win a payout.

A slot monitoring system (SMS) and/or a casino management system (CMS) may be provided for property A 102*a*. The slot monitoring system and casino management system may be referred to collectively as an SMS/CMS system 106. Thus, a reference to the SMS/CMS system 106 may refer to a slot monitoring system, a casino management system, or both a slot monitoring system and a casino management system. The SMS/CMS system 106 may be implemented using a single computer system, or the SMS/CMS system 106 may be implemented across multiple computer systems.

The slot machines 104 within property A 102*a* may be in electronic communication with the SMS/CMS system 106 via a local area network (LAN) 107. The SMS/CMS system 106 may be used to implement reward programs for players of the slot machines 104. As part of implementing reward programs, the SMS/CMS system 106 may monitor and track player activity on the slot machines 104. The SMS/CMS system 106 may also store information about players' activity on the slot machines 104 in a player database 108 that is maintained for property A 102*a*. Although not explicitly shown in FIG. 1, property B 102*b*, property C 102*c*, and property D 102*d* may be configured similarly to property A 102*a*.

A central player database 110 may also be provided. The central player database 110 may be in electronic communication with the SMS/CMS systems 106 at the various properties 102 via a network 112, which may be a wide area network. From time to time, the information that is stored in the player databases 108 at the various properties 102 may be uploaded to the central player database 110.

As indicated above, embodiments disclosed herein relate generally to systems and methods for providing personalized rewards for players of slot machines 104. The SMS/CMS systems 106 at the various properties 102 may work together to implement reward programs that provide personalized rewards to slot machine players. Various rules 116 for the reward programs may be defined. The SMS/CMS systems 106 at the various properties 102 may access these rules 116 to implement various aspects of the reward programs.

The SMS/CMS systems 106 at the various participating properties 102 may provide slot machine players with access to reward program information. There are many ways that this reward program information may be accessed. For example, reward program information may be accessed while playing on slot machines 104. Alternatively, or in addition, kiosks may be provided, and players may be able to access reward program information through these kiosks. As yet another example, players may be able to access reward program information via an e-commerce interface.

Figure 2:
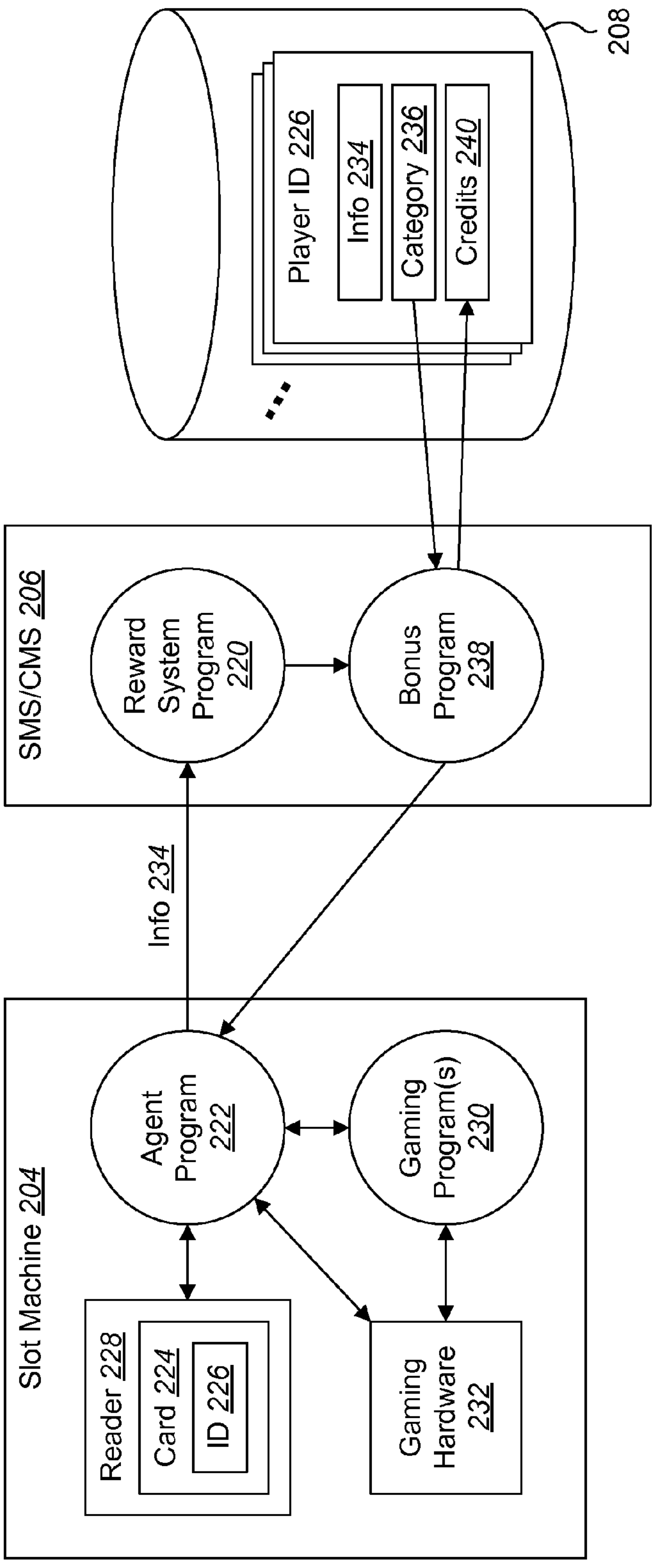
FIG. 2 illustrates some aspects of a slot monitoring system, a casino management system, a slot machine and a player database in accordance with an embodiment.

FIG. 2 illustrates some aspects of an SMS/CMS 206, a slot machine 204 and a player database 208 in accordance with an embodiment. The SMS/CMS 206 in FIG. 2 is shown with a computer program 220 that may be used to implement a reward program for providing rewards to slot machine players. This computer program 220 may be referred to herein as a reward system program 220. A slot machine 204 may include a computer program 222 that communicates information about the slot machine 204 to the reward system program 220. This computer program 222 may be referred to herein as an agent program 222.

A slot machine player who registers to participate in the reward program may be provided with a player identification card 224 (sometimes referred to as a player tracking card). The player identification card 224 may include a unique player identifier 226 (i.e., an identifier 226 that is not assigned to any other slot machine player). Before starting to play on the slot machine 204, a player may insert his/her player identification card 224 into a card reader 228 on the slot machine 204. By reading the player identification card 224, the card reader 228 may extract the player identifier 226. When this occurs, the agent program 222 on the slot machine 204 may send the player identifier 226 to the reward system program 220. This may have the effect of notifying the reward system program 220 about the identity of the current player on the slot machine 204.

As the player continues to play on the slot machine 204, the agent program 222 may monitor gaming program(s) 230 and/or gaming hardware 232 on the slot machine 204 to determine information about the player's activity on the slot machine 204. For example, the agent program 222 may determine how much money the player wagers at the slot machine 204, how much money the player wins at the slot machine 204, etc.

The agent program 222 may report information 234 about the player's activity on the slot machine 204 to the reward system program 220. The reward system program 220 may record this information 234 in the player database 208, where it may be associated with the player's unique player identifier 226. The information 234 about the player's activity on the slot machine 204 may be referred to as playing history information 234.

Playing history information 234 may be determined each time that a player plays at a slot machine 204 using his or her player identification card 224. As a result, over time a substantial amount of playing history information 234 may be accumulated. The playing history information 234 that is accumulated for a particular player may be used to determine how valuable (e.g., profitable) the player is to an organization that owns one or more properties 102

In accordance with an embodiment, multiple player categories 236 may be defined. As a simple example, two different player categories 236 may be defined: one player category 236 for highly profitable players, and another player category 236 for players who are not as profitable. Alternatively, more than two player categories 236 may be defined.

Each player that registers to participate in the reward program may be assigned to one of the defined player categories 236. To assign a player to a particular player category 236, the player's identifier 226 may be associated with the player category 236 in the player database 208. The playing history information 234 that has been accumulated for a particular player may be used to determine the player category 236 to which the player is assigned.

The reward system 202 may include a computer program 238 that may be used to award bonus credits 240 to slot machine players. This computer program 238 may be referred to herein as a bonus program 238. Bonus credits 240 may be awarded in response to certain events that occur on the slot machine 204. For example, bonus credits 240 may be awarded to a particular player in response to the player achieving a winning combination on the slot machine 204, the player wagering a certain amount of money on the slot machine 204 within a defined period of time, etc. The bonus credits 240 that are awarded to a particular player may be awarded in addition to any credits won by the player during normal play of the slot machine.

The bonus credits 240 for a particular player may include a mixture of non-cashable credits, cashable credits, and hand-paid funds. For example, the bonus credits 240 up to a first threshold (0 . . . X) may be cashable credits, the bonus credits 240 above the first threshold up to a second threshold (X+1 . . . Y) may be non-cashable credits, and the bonus credits 240 above the second threshold (Y+1 and above) may be hand-paid funds. However, it is not necessary that bonus credits 240 always include non-cashable credits, cashable credits, and hand-paid funds. For instance, in the previous example, if it were desirable to award a player only non-cashable credits and hand-paid funds, then the first threshold (X) may be set to zero.

The number of bonus credits 240 that are awarded to a particular player may depend on the player category 236 to which the player has been assigned (e.g., the player category 236 that is associated with the player's identifier 226 in the player database 208). For the same event occurring on the slot machine 204, a player that has been assigned to a more profitable category 236 may receive more bonus credits 240 from the bonus program 238 than a player that has been assigned to a less profitable category 236.

The bonus program 238 may award bonus credits 240 to a player by updating the player database 208. For example, the bonus program 238 may increase the number of bonus credits 240 that are associated with the player's identifier 226 in the player database 208. The bonus program 238 may notify the agent program 222 on the slot machine 204 about the number of bonus credits 240 that have been awarded. The bonus program 238 may also direct the agent program 222 to display a message to the slot machine player notifying him or her about the bonus credits 240 that have been awarded.

Typically, a slot machine 204 is configured so that for every complete pay cycle (e.g., a certain number of spins on the slot machine 204), the slot machine 204 keeps a certain percentage of the money that is wagered. This percentage is sometimes referred to as the hold percentage. The payback percentage (sometimes referred to as the payout percentage) is the opposite of the hold percentage—i.e., it is the percentage of the wagered money that the slot machine 204 pays back to players over a complete pay cycle. The process described above—where the bonus program 238 is used to award bonus credits 240 to players based on what player category 236 they belong to—has the effect of adjusting the payback percentage and the hold percentage of the slot machine 204 for players based on the information 234 that has been accumulated about their playing history. Thus, better players (e.g., players that play more frequently, spend more money, etc.) may be rewarded with lower hold percentages (and, conversely, higher payback percentages) than other players. Advantageously, the process described above allows hold/payback percentages to be changed for individual players without the need to make adjustments to the slot machines 204 themselves.

The architecture that is shown in FIG. 2 is provided for purposes of example only. Other architectures may be utilized. For example, some or all of the functionality that is provided by the bonus program 238, the reward system program 220, and/or the agent program 222 may be provided by multiple computer programs. Alternatively, some or all of the functionality that is provided by these programs may be combined into a single program.

The slot machine 204 may alternatively be configured to determine the identity of players through player identification devices other than the card reader 228, thereby eliminating the need for players to identify themselves using player identification cards 224. For example, the slot machine 204 could include a keypad, at which players enter either their player identification numbers or their names along with a secured password. The slot machine 204 could also include a device for measuring player biometrics (i.e., facial features, fingerprint, voice, or retinal scan) to identify players.

Figure 3:
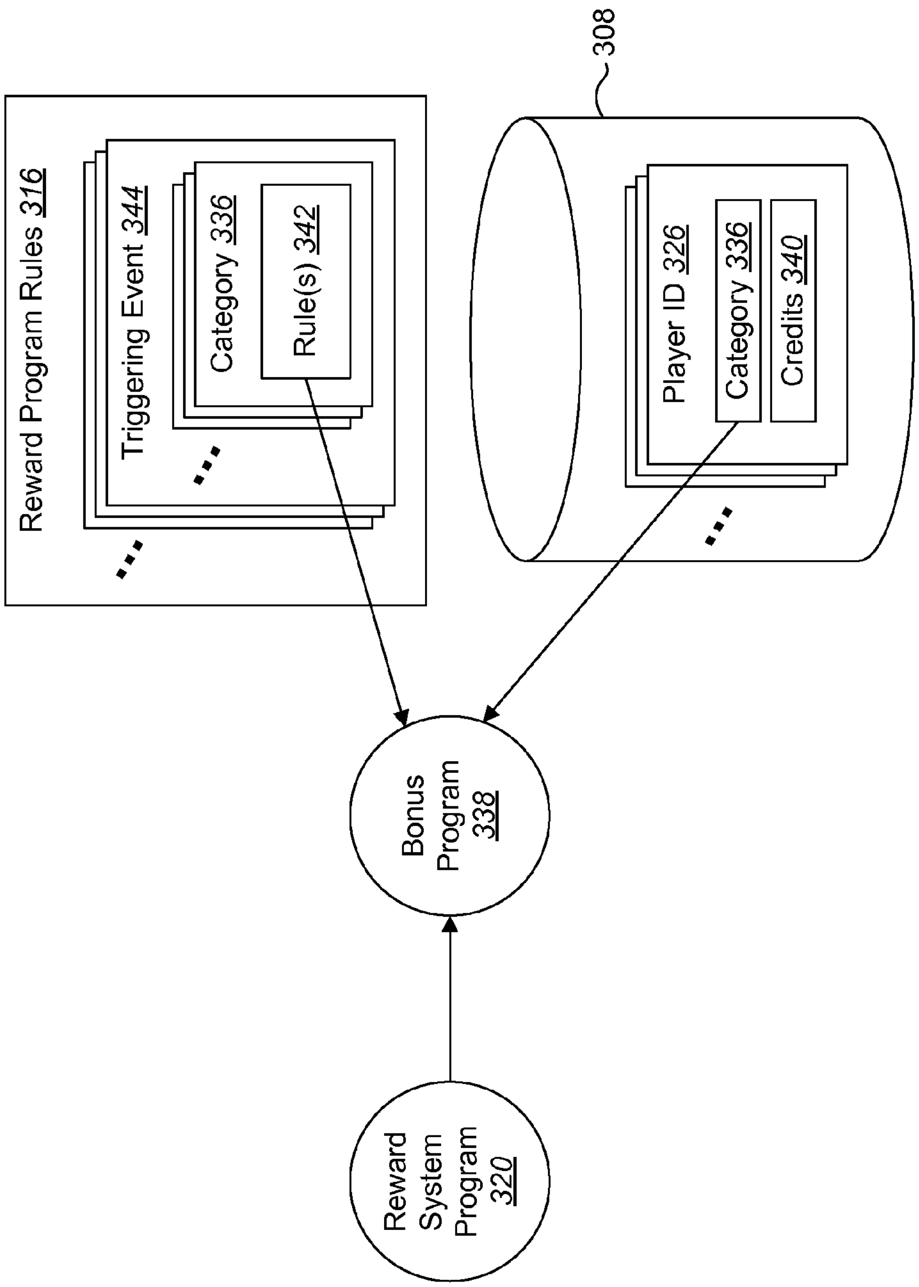
FIG. 3 illustrates some aspects of a reward system program and a bonus program in accordance with an embodiment.

FIG. 3 illustrates some aspects of a reward system program 320 and a bonus program 338 in accordance with an embodiment. The bonus program 338 may award bonus credits 340 to slot machine players in accordance with certain rules 342 that may be defined. These rules 342 may be referred to as bonus rules 342. The bonus rules 342 may be included as part of reward program rules 316 that may be defined.

The reward program rules 316 may also define a number of triggering events 344. Examples of triggering events 344 include a player achieving a winning combination on a slot machine 104, a player wagering a certain amount of money on a slot machine 104 within a defined period of time, etc. For each triggering event 344 that is defined, one or more bonus rules 342 may be provided for each player category 336 that has been defined.

When a particular triggering event 344 occurs on a slot machine 104, the reward system program 320 may notify the bonus program 338 about the triggering event 344 that has occurred. The reward system program 320 may also notify the bonus program 338 about the player identifier 326 for the player that is currently playing on the slot machine 104. In response, the bonus program 338 may identify the player category 336 to which the player belongs. This may be done by querying the player database 308 for the player category 336 that is associated with the player identifier 326 that was received from the reward system program 320.

The bonus program 338 may also identify one or more bonus rules 342 that correspond to the triggering event 344 that has occurred and the player category 336 to which the current slot machine player belongs. Once the bonus rules 342 have been identified for the appropriate player category 336, the bonus program 338 may award bonus credits 340 to the current slot machine player in accordance with the identified bonus rules 342.

FIG. 4 illustrates an example of a bonus rule 442 that may be defined. The triggering event 344 that is associated with the depicted bonus rule 442 is a player achieving a winning combination on a slot machine 104. The depicted bonus rule 442 defines the number of bonus credits 340 to be awarded as a function of the player category 336 and the number of coins that were played. In the depicted example, three different player categories 336 are defined. These different player categories 336 will be referred to as player category A, player category B, and player category C. It will be assumed that the players in player category A are more profitable than the players in player category B, and that the players in player category B are more profitable than the players in player category C. In this example, if a player in player category A achieves a winning combination of 7-7-7 while playing three coins, then the depicted bonus rule 442 provides that 12 bonus credits are awarded. However, if a player in player category B achieves the same winning combination while playing the same number of coins, then the depicted bonus rule 442 provides that only 8 bonus credits are awarded. If a player in player category C achieves the same winning combination while playing the same number of coins, then the depicted bonus rule 442 provides that only 4 bonus credits are awarded.

FIG. 5 illustrates another example of a bonus rule 542 that may be defined. The triggering event 344 that is associated with the depicted bonus rule 542 is a player wagering a certain amount of money on a slot machine 104 within a defined period of time. The depicted bonus rule 542 defines the number of bonus credits 340 to be awarded as a function of the player category 336 and the amount of money that was wagered within the defined period of time. If a player in player category A wagers $200 within one hour of consecutive play, then the depicted bonus rule 542 provides that 10 bonus credits are awarded. However, if a player in player category B wagers the same amount within the same time period, then the depicted bonus rule 542 provides that only 5 bonus credits are awarded. If a player in player category C wagers the same amount within the same time period, then the depicted bonus rule 542 provides that only 1 bonus credit is awarded.

FIG. 6 illustrates another example of a bonus rule 642 that may be defined. The triggering event 344 that is associated with the depicted bonus rule 642 is a player on a slot machine 104 spending a certain amount of consecutive time playing on the slot machine 104. The depicted bonus rule 642 defines the number of bonus credits 340 to be awarded as a function of the player category 336 and the amount of consecutive time that was spent playing at the slot machine 104. If a player in player category A spends one consecutive hour playing at a slot machine 104, then the depicted bonus rule 642 provides that 5 bonus credits are awarded. However, if a player in player category B spends the same amount of time consecutively playing at a slot machine 104, then the depicted bonus rule 642 provides that only 3 bonus credits are awarded. If a player in player category C spends the same amount of time consecutively playing at a slot machine 104, then the depicted bonus rule 642 provides that zero bonus credits are awarded. The depicted bonus rule 642 provides that a player in player category C receives bonus credits only after spending at least 1.5 hours consecutively playing at a slot machine 104.

The specific triggering events 344 that were discussed above in connection with FIGS. 4-6 are provided for example purposes only. Many other types of triggering events 344 may be defined. Also, the numbers in the tables that are shown in FIGS. 4-6 are provided for example purposes only.

Figure 7:
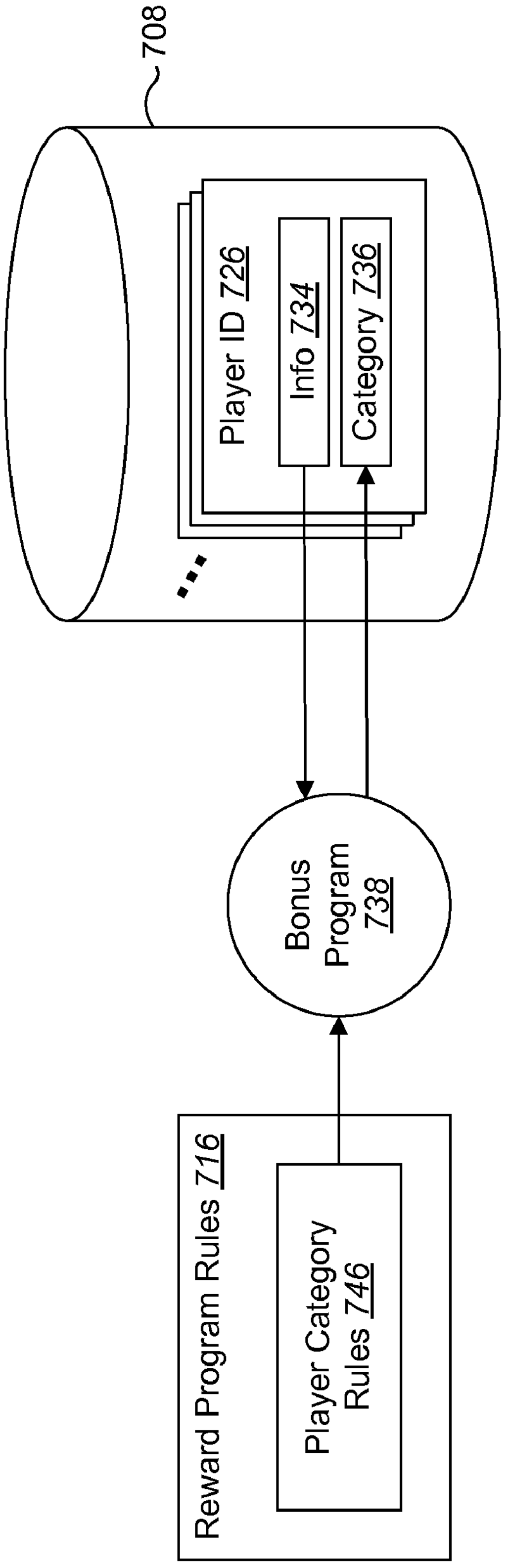
FIG. 7 illustrates some aspects of a bonus program in accordance with an embodiment.

FIG. 7 illustrates some aspects of a bonus program 738 in accordance with an embodiment. The bonus program 738 may be used to assign player categories 736 to players. For example, the bonus program 738 may evaluate player history information 734 that has been accumulated for the player (e.g., that is associated with the appropriate player identifier 726 in the player database 708) based on predefined rules 746. These rules 746 may be referred to herein as player category rules 746. The player category rules 746 may be part of the reward program rules 716 that are defined.

Figures 8, 9:
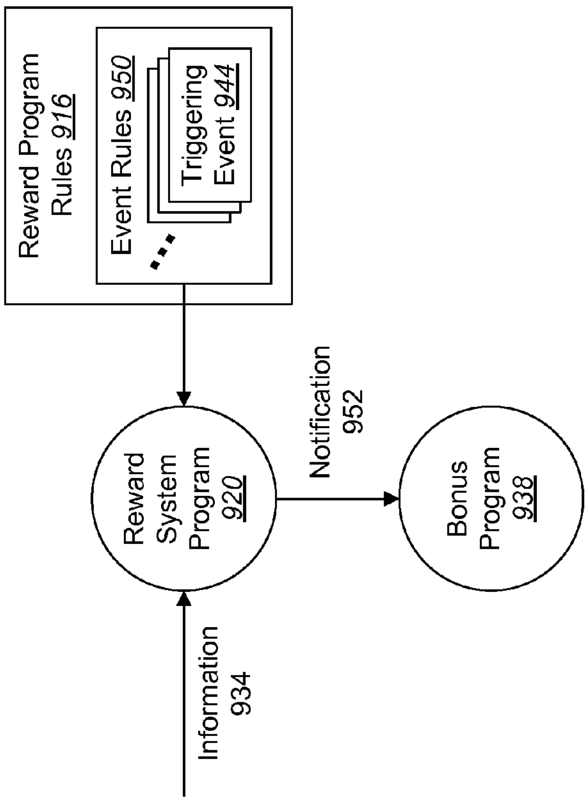
FIG. 8 illustrates an example of player category rules that may be defined.
FIG. 9 illustrates some aspects of a reward system program and a bonus program in accordance with an embodiment.

FIG. 8 illustrates an example of player category rules 846 that may be defined. In the depicted example, the player category rules 846 are defined so that the player category 836 to which a particular player is assigned depends on the amount of money that the player has wagered during a certain period of time at one or more properties 102. This value may be referred to as the amount wagered 848. The depicted player category rules 846 are defined so that if the amount wagered 848 exceeds a first threshold value, then the player is assigned to player category A. (The amount wagered 848 is labeled x in FIG. 8, and the first threshold value is labeled Threshold1 in FIG. 8.) However, if the amount wagered 848 does not exceed the first threshold value, but the amount wagered 848 does exceed a second threshold value, the player may be assigned to player category B. (The second threshold value is labeled Threshold2 in FIG. 8.) If the amount wagered 848 does not exceed the second threshold value, the player may be assigned to player category C.

FIG. 9 illustrates some aspects of a reward system program 920 and a bonus program 938 in accordance with an embodiment. The reward system program 920 may determine when a triggering event 944 has occurred. For example, the reward system program 920 may receive information 934 about a player's activity on a slot machine 104. The reward system program 920 may evaluate this information 934 based on rules 950 that define when a triggering event 944 has occurred. These rules 950 may be referred to herein as event rules 950. The event rules 950 may be included as part of reward program rules 916 that may be defined. When the reward system program 920 determines that a triggering event 944 has occurred based on the event rules 950, the reward system program 920 may notify the bonus program 938. This may be accomplished by sending a notification message 952 to the bonus program 938.

Alternatively, the reward system program 920 may forward the information 934 that it receives to the bonus program 938. The bonus program 938 may then evaluate this information 934 based on the event rules 950 in order to determine when a triggering event 944 has occurred.

Figure 10:
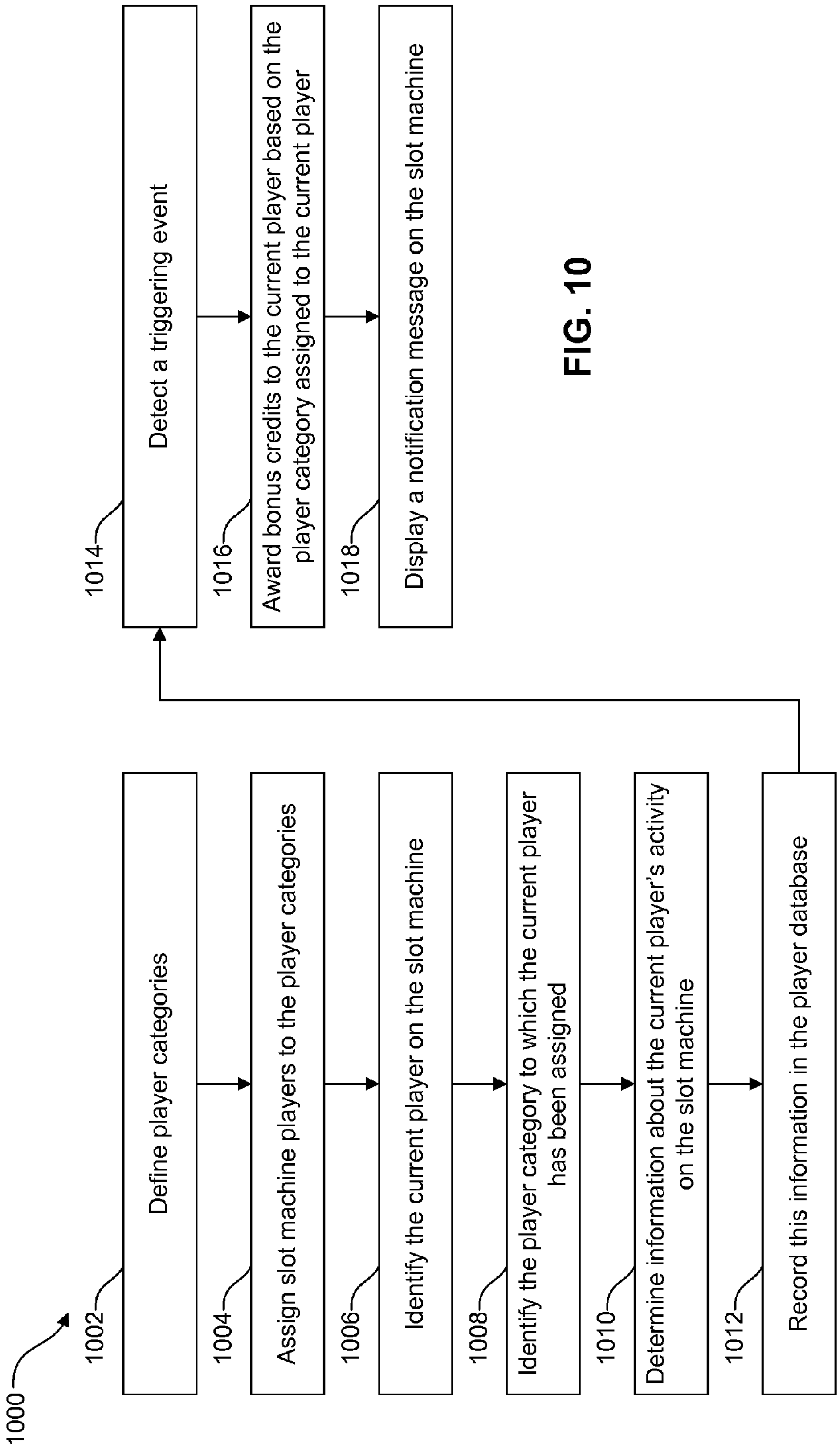
FIG. 10 illustrates a method for providing personalized rewards to slot machine players in accordance with an embodiment.

FIG. 10 illustrates a method 1000 for providing personalized rewards to slot machine players in accordance with an embodiment. The method 1000 may involve defining 1002 multiple player categories 236 and assigning 1004 slot machine players to the player categories 236 that have been defined. As discussed above, assigning 1004 slot machine players to player categories 236 may involve evaluating player history information 734 that has been accumulated for the player based on predefined player category rules 746.

During a gaming session involving a particular slot machine 104, the method 1000 may involve identifying 1006 the current player on the slot machine 104. This may involve receiving the player identifier 226 for the current player from the slot machine 104. The player category 236 to which the current player has been assigned may also be identified 1008.

During the gaming session, the method 1000 may also involve determining 1010 information about the current player's activity on the slot machine 104 (e.g., how much money the player wagers at the slot machine 104, how much money the player wins at the slot machine 104, etc.). This information 234 may be recorded 1012 in a player database 208, where it may be associated with the player's unique player identifier 226.

At some point during the gaming session, a triggering event 344 may be detected 1014. Detecting 1014 a triggering event 344 may involve evaluating information 934 about the current player's activity on the slot machine 104 based on predefined event rules 950, as discussed above. In response to detecting 1014 a triggering event 344, bonus credits 240 may be awarded 1016 to the player. The number of bonus credits 240 that are awarded to a particular player may depend on the player category 236 to which the player has been assigned. For example, in response to the same triggering event 344 occurring on the slot machine 104, a player that has been assigned to a more profitable category 236 may receive more bonus credits 240 than a player that has been assigned to a less profitable player category 236.

In response to bonus credits 240 being awarded 1016 to the player, a notification message may be displayed 1018 on the slot machine 104. The notification message may be displayed via a known interface, which may be part of an SMS/CMS system 106. Some examples of interfaces that may be used and that may be part of an SMS/CMS system 106 include an SMS interface (e.g., a two-line text display provided as part of SMS), an iCMS interface, an Iview interface, a standard text digital display, an NT interface, etc.

Figure 11:
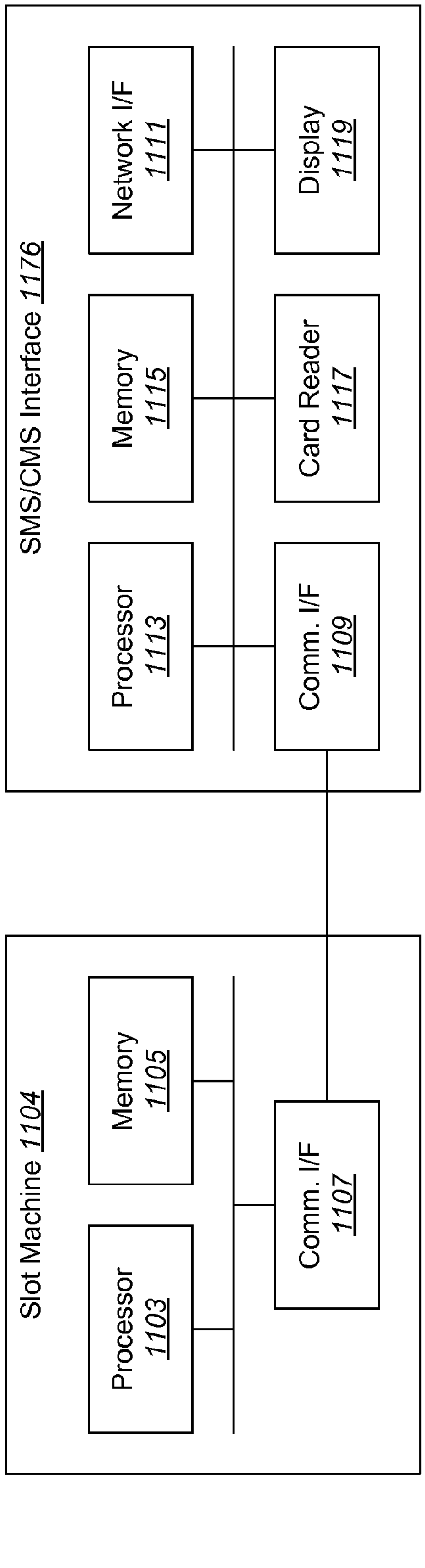
FIG. 11 illustrates an example of a slot machine configuration that may be utilized in accordance with an embodiment.

FIG. 11 illustrates an example of a slot machine configuration that may be utilized in accordance with an embodiment. A slot machine 1104 is shown with a processor 1103 and memory 1105. The processor 1103 may control the operation of the slot machine 1104 and may be embodied as a microprocessor, a microcontroller, a digital signal processor (DSP) or other device known in the art. The processor 1103 typically performs logical and arithmetic operations based on program instructions stored within the memory 1105. The program instructions within the memory 1105 may be executed by the processor 1103 to implement the different types of games that may be played on the slot machine 1104.

The slot machine 1104 is also shown with a communication interface 1107. The communication interface 1107 may be used to communicate with an SMS/CMS interface component 1176. The SMS/CMS interface component 1176 may include a communication interface 1109 for communicating with the slot machine 1104. The SMS/CMS interface component 1176 is also shown with a network interface 1111, which may be used to communicate with an SMS/CMS system 106 via a network.

The SMS/CMS interface component 1176 is also shown with a processor 1113 and memory 1115. The processor 1113 may perform logical and arithmetic operations based on program instructions stored within the memory 1115. The program instructions within the memory 1115 may be executed by the processor 1113 to implement various features of the embodiments described herein. Alternatively, these functions may be performed by an SMS/CMS system 106, and the SMS/CMS interface component 1176 may simply provide signals to the SMS/CMS system 106 that are subsequently interpreted by the SMS/CMS system 106. Advantageously, it is not necessary to make any changes to the slot machine 1104 itself to implement features of the embodiments described herein.

The SMS/CMS interface component 1176 may also include a card reader 1117. When a player begins playing on the slot machine 1104, the player may insert a player tracking card into the card reader 1117, and the card reader 1117 may extract the player's unique player ID from the player tracking card. This may have the effect of identifying the player. The SMS/CMS interface component 1176 may also include a display 1119. The display 1119 may be used to communicate certain information to the current player of the slot machine 1104.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limiting the scope of the claims.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A method for providing personalized rewards to slot machine players, comprising:

defining, by a computing device, multiple player categories;

providing, by the computing device, player category rules, wherein the player category rules comprise threshold values that represent different amounts of money wagered by slot machine players over a first period of time;

assigning, by the computing device, slot machine players to the player categories based on the player category rules, wherein a slot machine player is assigned to a player category whose threshold is less than an amount wagered by the slot machine player over the first period of time; and during a gaming session on a slot machine:

identifying, by the computing device, a current player on the slot machine;

identifying, by the computing device, a player category to which the current player is assigned;

detecting, by the computing device, a triggering event involving the current player's activity on the slot machine; and in response to detecting the triggering event, awarding, by the computing device, bonus credits to the current player, wherein awarding the bonus credits to the current player comprises evaluating one or more bonus rules that correspond to the triggering event that is detected, and wherein the bonus rules define the number of bonus credits to be awarded as a function consisting of the player category and a number of coins wagered on the current spin of the slot machine, wherein the bonus credits awarded to the current player changes a hold percentage of the slot machine, wherein for one category of player the hold percentage is lowered whereas for another category of player, the hold percentage is increased.

2. The method of claim 1, wherein the player categories correspond to different levels of play on slot machines at one or more participating properties.

3. The method of claim 1, wherein assigning the slot machine players to the player categories comprises evaluating player history information based on player category rules.

4. The method of claim 1, wherein identifying the current player on the slot machine comprises reading a player identifier from a player identification card.

5. The method of claim 1, wherein the bonus credits are awarded in addition to any credits won by the current player during normal play of the slot machine.

6. The method of claim 1, wherein awarding the bonus credits to the current player comprises updating a player database.

7. The method of claim 1, wherein the bonus credits are awarded to the current player during the gaming session.

8. The method of claim 1, wherein the bonus credits comprise:

non-cashable credits up to a first threshold;

cashable credits between the first threshold and a second threshold, wherein the second threshold is greater than the first threshold; and hand-paid funds beyond the second threshold.

9. The method of claim 1, further comprising displaying a notification message on the slot machine in response to the bonus credits being awarded to the current player.

10. The method of claim 1, further comprising providing access to reward program information via one or more kiosks.

11. The method of claim 1, further comprising providing access to reward program information via an e-commerce interface.

12. The method of claim 1, further comprising, during the gaming session:

determining information about the current player's activity on the slot machine; and recording the information in a player database.

13. A computer system that is configured to provide personalized rewards to slot machine players, comprising:

a processor;

memory in electronic communication with the processor;

instructions stored in the memory, the instructions being executable to:

define multiple player categories;

provide player category rules, wherein the player category rules comprise threshold values that represent different amounts of money wagered by slot machine players over a first period of time;

assign slot machine players to the player categories based on the player category rules, wherein a slot machine player is assigned to a player category whose threshold is less than an amount wagered by the slot machine player over the first period of time; and during a gaming session on a slot machine:

identify a current player on the slot machine;

identify a player category to which the current player is assigned;

detect a triggering event involving the current player's activity on the slot machine; and in response to detecting the triggering event, award bonus credits to the current player, wherein awarding the bonus credits to the current player comprises evaluating one or more bonus rules that correspond to the triggering event that is detected, and wherein the bonus rules define the number of bonus credits to be awarded as a function consisting of the player category and a number of coins wagered on the current spin of the slot machine, wherein the bonus credits awarded to the current player changes a hold percentage of the slot machine, wherein for one category of player the hold percentage is lowered whereas for another category of player, the hold percentage is increased.

* * * * *